S. R. AUDIBERT.
WRENCH.
APPLICATION FILED MAR. 22, 1913.
1,081,193.
Patented Dec. 9, 1913.
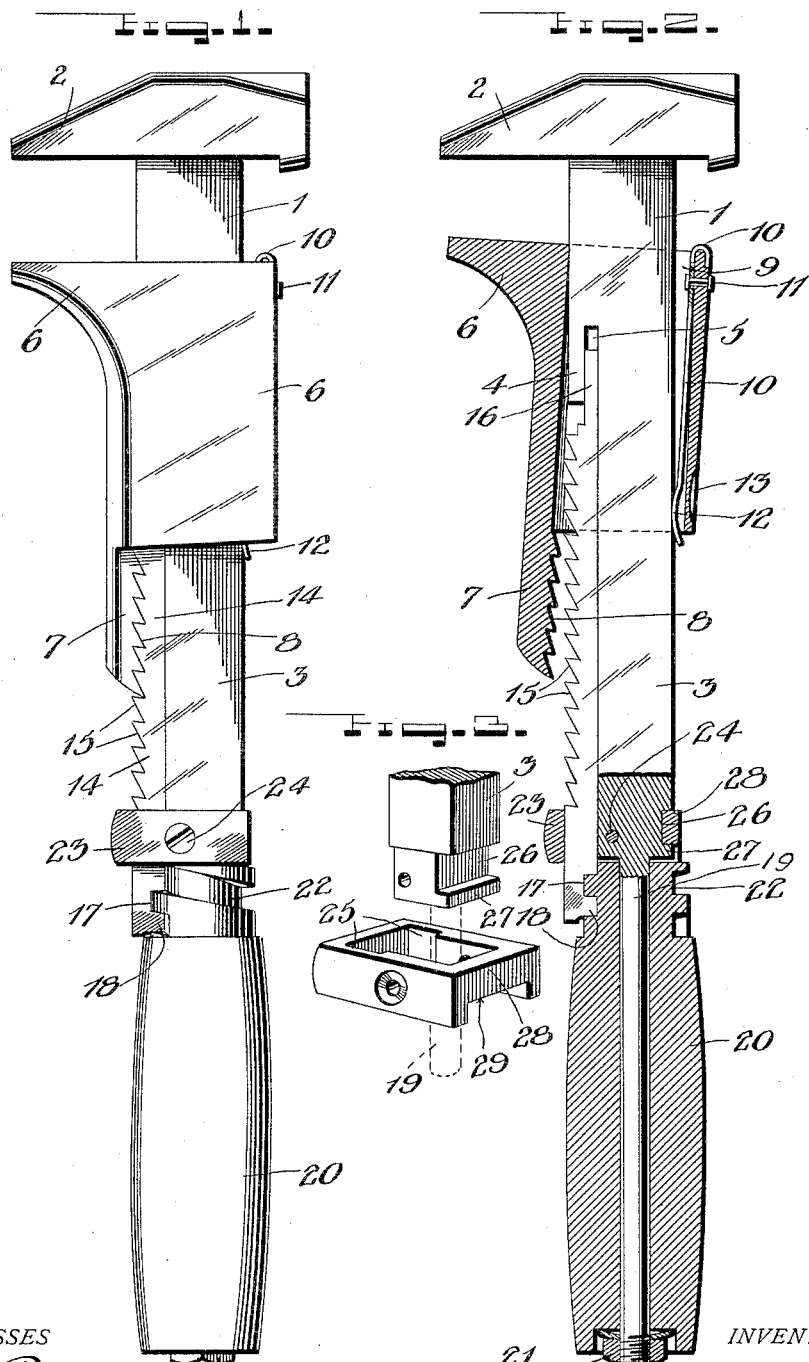
WITNESSES
INVENTOR
S. R. Audibert
his Attorney

UNITED STATES PATENT OFFICE.

STEPHEN R. AUDIBERT, OF FORT KENT, MAINE.

WRENCH.

1,081,193.  Specification of Letters Patent.  Patented Dec. 9, 1913.

Application filed March 22, 1913. Serial No. 756,194.

*To all whom it may concern:*

Be it known that I, STEPHEN R. AUDIBERT, a citizen of the United States of America, residing at Fort Kent, in the county of Aroostook and State of Maine, have invented certain new and useful Improvements in Wrenches, of which the following is a specification, reference being had therein to the accompanying drawing.

This invention relates to a wrench and has for its object the production of a simple and efficient means for quickly adjusting the same to accommodate the article which is being gripped.

Another object of this invention is the production of a simple means for more firmly gripping the article as more pressure is brought to bear upon the handle.

With these and other objects in view, this invention consists of certain novel combinations, constructions and arrangement of parts as will be hereinafter fully described and claimed.

In the accompanying drawing: Figure 1 is a side elevation of the wrench. Fig. 2 is a central longitudinal section showing the rack bar and shank in elevation. Fig. 3 is a perspective view of the retaining collar and a portion of the shank.

Referring to the accompanying drawing by numerals it will be seen that this device comprises a shank 1 to which the head 2 is fixedly secured. This shank 1 is provided with the reduced portion 3 and a lip 4 thereby forming a longitudinal pocket 5. Mounted upon this shank 1 there is a movable jaw 6 which is provided with a finger 7 upon which is formed the teeth 8. This jaw 6 is provided with an enlarged opening 9 so as to allow the same to slide freely along the shank 1. Positioned within the pocket 9 there is a spring 10 which is held in position by the rivet 11. The inner end of the spring 10 is provided with the bowed portion 12 which rests upon the shank 1 so as to normally urge the portion 7 of the jaw 6 toward the shank 1. The rear portion of the jaw 6 is provided with a sunken portion 13 for allowing the jaw 6 to be easily gripped for pressing the spring and moving the finger 7 away from the shank.

Slidably mounted upon the shank 1 there is a rack bar 14 which is provided with a plurality of teeth 16. One end of the rack bar 14 terminates in an elongated arm 16 which slides within the pocket 5. The opposite end of the rack bar 14 is provided with a socket 17 and a lug 18. The teeth 8 of the finger 7 normally engage the teeth 15 of the rack bar 14 whereby the jaw 6 will be securely held upon a nut or other article which is being gripped.

The outer end of the shank 1 is provided with a neck 19 upon which the handle 20 is rotatably mounted. In order to hold this handle 20 upon the neck 19 there is provided a nut 21 which is threaded upon the outer end of the bolt. The inner end of the handle is provided with a worm cam 22 which engages the lug 18 of the rack bar 14.

In order to hold the rack bar 14 in engagement with the worm cam 22 there is provided a retaining collar 23 which is held upon the shank 1 by means of the screw 24 passing through the reduced portion 3 of the shank 1. This retaining collar is provided with a pocket portion 25 through which the rack bar 14 is adapted to slide. The rear portion of the collar 23 fits within a groove 26 formed upon the reduced portion 3 of the shank 1 for relieving the strain from the screw 24.

When it is desired to use this device, the device is moved so as to be in position as illustrated in Fig. 1. The jaw 6 is then moved so as to engage the article which is to be gripped since the teeth will allow the jaw to be easily moved toward the head 2. After the jaw is brought into engagement with the article the handle is then grasped and turned so as to force the lug 18 upward by means of the worm cam 22 whereby the rack bar may be moved upward and since the rack bar 14 engages the finger 7, the jaw 6 will be made to more firmly grip the article. As the worm cam 22 is formed integrally upon the handle 20, as the wrench is moved pressure is brought to bear upon the handle which will rotate a little so as to more firmly bind the jaw 6 of the head 2 in engagement with the article which is being turned. If the worm cam were formed separately from the handle, the only gripping means that could be obtained would be by the use of the fingers and as the wrench was moved the pressure within the jaws would cause the same to work loose, whereas by the use of the handle, above described, pressure is brought to bear upon the jaw 6 as long as the wrench is in use.

As the shank 1 is provided with the reduced portion 3 the breadth of the reduced portion 3 and the rack bar 14 equals the breadth of the outer end of the shank 1, and since the rack bar 14 rests upon the front portion of the reduced portion 3 it extends evenly with the outer end of the shank 1 and will in this manner allow the jaw 6 to pass thereover when it is desired to remove the jaw from engagement with an article by compressing the spring 12 at which time the teeth 8 of the arm 7 will move over the teeth 15 of the rack bar 14.

From the foregoing description, it will be seen that a simple device has been produced which may easily and quickly be adjusted to different sized nuts or other articles to be gripped, and which will continually grip the article as long as the wrench is in use.

By referring to Fig. 3 it will be seen that the reduced portion 3 of the shank 1 is provided with a rib 27 formed adjacent the groove 26. The bridge 28 of the collar 23 is provided with a notched portion 29 which is adapted to receive the rib 27 when the wrench is assembled and in this manner limit the longitudinal movement of the collar relative to the shank without the aid of the screw 24.

Having thus described the invention, what is claimed as new, is:

A wrench comprising a shank having a fixed jaw, a slidable jaw mounted on said shank, a rack bar positioned upon said shank for moving said slidable jaw, a handle carried by said shank and engaging said rack bar for operating the same, of a collar encircling said shank and said rack bar, said collar provided with an enlarged pocket in its forward portion for allowing said rack bar to slide therethrough, said collar provided with a notched rear portion thereby forming a bridge, said shank provided with a transverse groove adjacent the inner end of said handle, a rib formed upon said shank adjacent said groove, the bridge formed upon said collar fitting in said groove, said rib of said shank fitting within the notched portion of said collar, whereby said collar will be held in position independent of secondary securing means, said collar adapted to hold said rack bar in engagement with said handle.

In testimony whereof I hereunto affix my signature in presence of two witnesses.

STEPHEN R. AUDIBERT.

Witnesses:
JOSEPH F. CYR,
VINCENT M. AUDIBERT,

Copies of this patent may be obtained for five cents each, by addressing the "Commissioner of Patents, Washington, D. C."